(12) United States Patent
Nishijima et al.

(10) Patent No.: US 6,520,198 B1
(45) Date of Patent: Feb. 18, 2003

(54) STRUCTURE AND METHOD FOR MOUNTING DAMPER

(75) Inventors: Hideya Nishijima, Nishi-kasugai-gun (JP); Shiro Matsubara, Nishi-kasugai-gun (JP); Yoshihiro Hashizume, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/719,151
(22) PCT Filed: Apr. 10, 2000
(86) PCT No.: PCT/JP00/02316
§ 371 (c)(1), (2), (4) Date: Jun. 14, 2001
(87) PCT Pub. No.: WO00/61396
PCT Pub. Date: Oct. 19, 2000

(30) Foreign Application Priority Data

Apr. 9, 1999 (JP) .............................. 11-103344

(51) Int. Cl.⁷ .............................. F16K 1/22; B60H 1/34
(52) U.S. Cl. .............................. 137/15.18; 137/15.25; 137/315.22; 251/305
(58) Field of Search ............................ 251/305, 298; 137/15.18, 15.25, 315.16, 315.22

(56) References Cited

U.S. PATENT DOCUMENTS 5,348,272 A * 9/1994 Lukstas et al. .......... 251/305 X
5,785,077 A * 7/1998 Rice ....................... 251/298 X

FOREIGN PATENT DOCUMENTS

JP 61-11413 1/1986
JP 2-17414 2/1990

* cited by examiner

Primary Examiner—Kevin Lee
(74) Attorney, Agent, or Firm—Oblon, Spivak, McClelland, Maier & Neustadt, P.C.

(57) ABSTRACT

A damper attaching structure which enables a damper provided with a thin rotational shaft to be assembled inside a casing or the like by employing an opening formed in the casing, is obtained by providing a concave groove which is formed in the inner surface of wall member and which is continuous from a casing opening; a positioning plate provided at the base of a damper thin shaft on the damper side thereof; a shaft hole which opens at the concave groove and which is larger than the cross section of the damper thin shaft; and a shaft fixing member which is provided on a lever, and which has an engaging hole into which the damper thin shaft is inserted and which engages the damper thin shaft member to enable torque transmission, and rotatably inserted into the shaft hole. The concave groove has a larger shape than the positioning member, the positioning member is inserted into the concave groove at the attachment position of the damper, and the positioning member adjusts the position of the damper along the shaft direction by intersection with the concave groove at the rotation position of the damper.

7 Claims, 7 Drawing Sheets

STRUCTURE AND METHOD FOR MOUNTING DAMPER

TECHNICAL FIELD

The present invention relates to a damper attaching structure and damper attaching method for a damper attached inside various types of casings in an air conditioning for a vehicle system or the like.

This application is based on Japanese Patent Application No. Hei 11-103344, the contents of which are incorporated herein by reference.

BACKGROUND ART

In an air conditioning system for an automobile, it has been the conventional practice to attach dampers for performing temperature adjustments or selective switching of outlet ports inside a casing.

FIGS. 5 and 6 show an overview of an air conditioning unit employed in a conventional air-conditioning system for a vehicle. Outlet ports 2a, 2b, and 2c open in a casing 1. Dampers 3a, 3b, and 3c are attached to outlet ports 2a, 2b, and 2c respectively. In order to facilitate attachment of each damper 3a, 3b, and 3c inside the casing 1 in this case, the casing 1 is designed to be formed by combining two separate left and right parts (1L, 1R). As a result of this design, an easy assembly is facilitated by passing rotational shafts provided to either end of the dampers into bearings in the casing 1, and inserting these rotational shafts into these bearings.

In addition, another conventional example shown in FIG. 7 employs a design in which the casing 1 is divided into upper and lower parts (1a, 1b) at a position at which a bearing 5 for supporting a rotational shaft 4 of a damper 2 can be divided into upper and lower portions. This design also facilitates easy assembly by inserting the rotational shaft 4 from a vertical direction into the bearing 5.

The above-described damper 2 can be opened and closed by a lever 6 attached to the outside of the casing 1. As shown in FIG. 8, this lever 6 is attached by fixing the same to the end of the rotational shaft 4 which projects to the outside of the casing 1.

Alternatively, as shown in FIG. 9, when the rotational shaft 4 is provided with a certain degree of thickness, then a shaft 6a is provided projecting outward from the lever 6, and can be attached by engaging in a shaft hole 4a which is provided in the rotational shaft 4. In this type of lever attachment structure, it is not necessary to provide the rotational shaft 4 projecting out from the damper 2. As a result, the damper 2 can be shortened by an amount corresponding to the rotational shafts 4 at either end thereof. Accordingly, the damper 2 can be incorporated inside the casing 1 by employing an appropriate opening such as an outlet port or a port communicating to another casing.

However, in the above-described conventional design, it is typically necessary to decide where to divide the casing after taking into consideration the incorporation of the damper within the casing. Thus, there are limitations to the inclination and direction of the plurality of outlet ports installed, so that there is less freedom of design.

By employing the lever attachment structure shown in FIG. 9 when the rotational shaft of the damper has a certain thickness, the damper can be assembled from an opening such as an outlet port without considering the division of the casing.

However, in the case where the rotational shaft is not sufficiently thick and it is not possible to employ a design in which the casing is divided at the bearing, or a design in which the casing is divided into left and right portions and the rotational shaft is inserted therebetween, then it is not possible to incorporate the damper inside the casing. Specifically, when there are a large number of dampers to be incorporated, then it is extremely difficult to employ a design for dividing the casing that is suitable for all the dampers.

The present invention was conceived in consideration of the above-described problems and has as its objective the provision of a damper attaching structure and damper attaching method in which a damper provided with a narrow rotational shaft can be assembled inside a casing by employing openings formed in various types of casings such as casing or duct.

DISCLOSURE OF INVENTION

In order to resolve the above-described problems, the present invention employs the following means.

The present invention provides a damper attaching structure in which both ends of a damper which is disposed between opposing wall members of a casing or the like are supported by the wall members in a manner so as to enable free rotation and the rotation operation of the damper is performed via a lever attached by a damper shaft on the outside of the wall member; the damper attaching structure comprising: a concave groove formed in the inner surface of the wall member and continuous with a casing opening; a positioning member provided at the base of the damper shaft on the damper side thereof; a shaft hole opening at the concave groove, which is larger than the cross section of the damper shaft; a shaft fixing member provided on the lever and rotatably inserted into the shaft hole; and an engaging hole into which the damper shaft member is inserted and which engages the damper shaft member to enable torque transmission; wherein the concave groove is larger in shape than the positioning member, the positioning member is inserted into the concave groove at the attachment position of the damper, and the positioning member adjusts the position of the damper along the shaft direction by crossing with the concave groove at the rotation position of the damper.

In this case, the angle formed between the positioning member and a center line in the longitudinal direction of the concave groove at a position of the rotational center when the damper is operating may be set to approximately 90°.

In addition, it is preferable that the damper shaft and the engaging hole have the same polygonal shape in cross section. The lever may be joined to the damper shaft which has been inserted into the shaft hole by pushing the lever in the direction of the shaft from the outside of the wall member.

According to the above damper attaching structure, even if the damper shaft is thin and it is not possible to employ a divided structure suitable to the casing or the like, it is still possible to incorporate the damper from the casing opening and attach the lever.

Furthermore, the present invention provides a damper attaching method, wherein both ends of a damper which is disposed between opposing wall members of a casing or the like are supported by the wall members in a manner so as to enable free rotation and the rotation operation of the damper is performed via a lever attached by a damper shaft on the outside of the wall member; the damper attaching structure comprising: a first step in which the end of the damper shaft and a positioning member, which is provided at the base of the damper shaft on the damper side thereof, are inclined downward and inserted into a concave groove that is formed in the inner surface of the wall member and is continuous with a casing opening, and the damper shaft is inserted into a shaft hole which opens at the concave groove and which is larger than the cross section of the damper shaft; a second step in which, after the positioning member has been inserted into the concave groove and the damper has been moved to the lever attachment side, the damper shaft which is circular in cross section is inserted into the shaft hole which is circular in cross section that is provided in the wall member opposite the wall member on the lever attachment side; and a third step in which, with the positioning member projecting out from the concave groove, the damper is rotated from the attachment position to the rotation position, while at the same time a shaft fixing member on the lever is inserted into the shaft hole in a manner so as to enable rotation and an engaging hole provided in the shaft fixing member is joined to the damper shaft so as to enable torque transmission.

Note that the rotation of the damper from the attachment position to the rotation position in the third step may be approximately 90°.

As a result of this type of damper attaching method, a damper can be incorporated from the casing opening and the lever can be attached, even when the damper shaft is thin and it is not possible to employ a suitable divided structure for the casing or the like.

BRIEF DESCRIPTION OF DRAWINGS

FIG. 1A is a principal portion cross sectional perspective view showing the arrangement at the rotation position with assembly completed; FIG. 1B is a cross sectional view taken on line A—A in FIG. 1A; FIG. 1C is a cross sectional view taken on line B—B in FIG. 1B.

BEST MODE FOR CARRYING OUT THE INVENTION

An embodiment of the damper attaching structure and damper attaching method according to the present invention will now be explained based on the figures.

Figure 1:
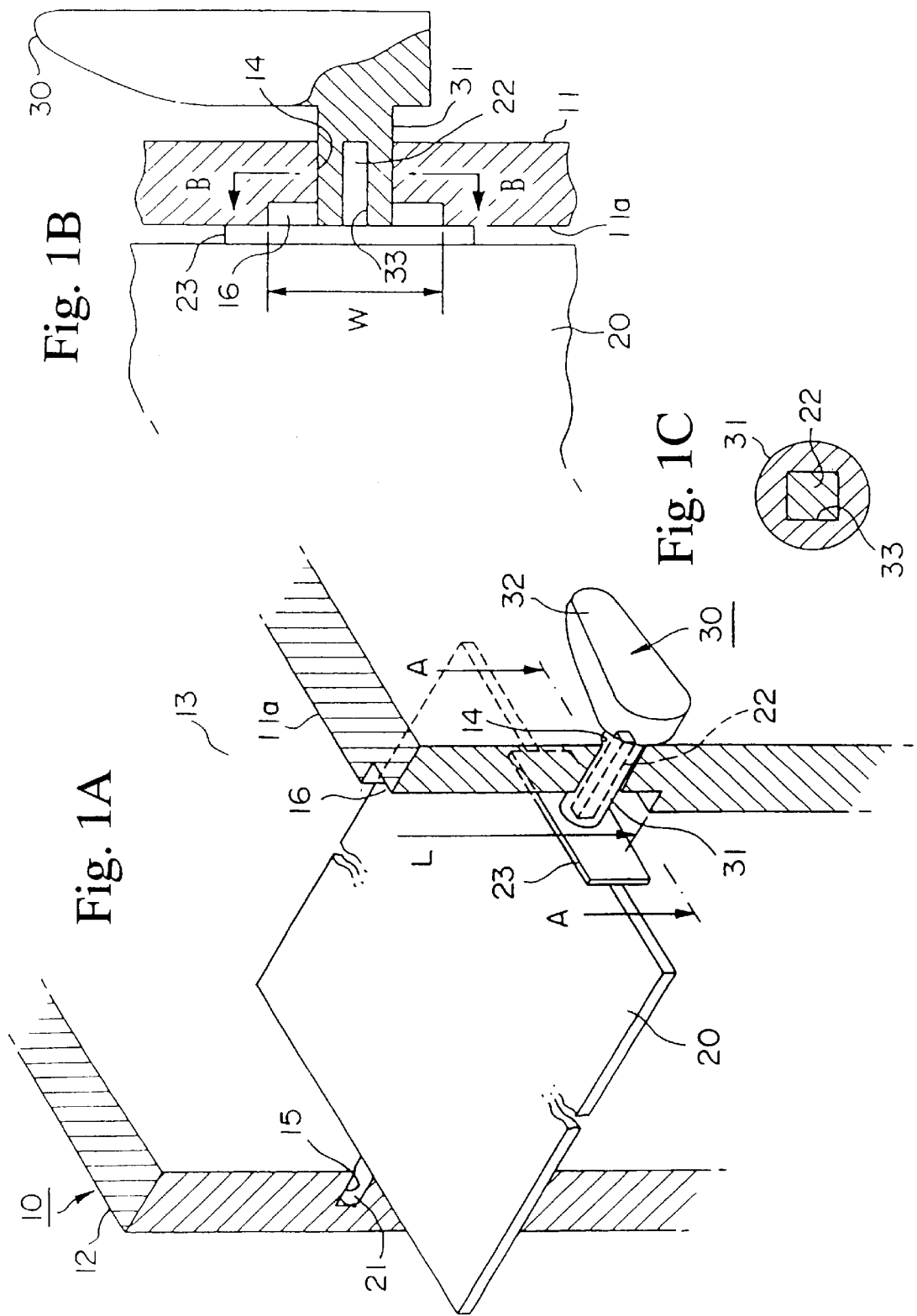
FIG. 1 shows a first embodiment of a damper attaching structure according to the present invention.

As shown in FIG. 1, the damper attaching structure comprises a casing 10, wall members 11 and 12 of the casing 10 disposed opposite one another, an opening 13 provided at the upper portion of casing 10, a damper 20, and a lever 30 for rotating (opening/closing) the damper 20.

FIG. 1A shows a completed assembly, in which both ends of the damper 20, which is provided in between the opposing wall members of the casing 10, are supported by the wall members 11 and 12 so as to enable free rotating of the damper. In other words, FIG. 1A shows the state in which damper 20 is at the center position of rotation.

A shaft hole 14 is provided in the wall member 11 so as to pass through the wall member 11 and reach to the outside of the wall member 11. A shaft fixing member 31 of the lever 30 explained below is rotatably inserted into the shaft hole 14. This shaft hole 14 has a larger cross section than that of a damper thin shaft member 22 of the damper 20 explained below. A support hole 15 is provided to the other wall member 12 and functions as a bearing for a damper shaft member 21 which projects outward from the damper 20. Note that this support hole 15 may be provided with an intermediate thickness as shown in the figure, or may be a hole passing through the wall member 12, according to various conditions such as the thickness of the wall member 12.

A concave groove 16 is provided to the inner surface 11a of the wall member 11 to which the lever 30 is attached. This concave groove 16 is rectangular in shape and is open at the upper end toward an opening 13. The width W of the concave groove 16 is smaller than the length L in the vertical direction. A center line extending along the longitudinal direction of the concave groove 16 is in the vertical direction, and the concave groove 16 has a positional relationship with the damper 20 such that it deviates by approximately 90° from the longitudinal plane of the damper 20 when the damper 20 is horizontal and at its center position of rotating.

The damper 20 is a plate-shaped member provided with the damper shaft member 21 and the damper thin shaft member 22 which are provided projecting out from either end of the damper 20. A rectangular positioning plate 23 which functions as a positioning member is provided to the base of damper thin shaft member 22 on the damper side thereof, on the wall member 11 side to which the lever 30 is attached. This positioning plate 23 is designed to enter into the above-described concave groove 16. The length and width of positioning plate 23 are less than that of concave groove 16. It is preferable that the thickness of positioning plate 23 is less than the depth of concave groove 16.

In the embodiment shown in the figures, the damper thin shaft member 22 is square in cross section. Since the objective is that the damper thin shaft member 22 and the lever 30 explained below are connected in a manner that enables torque transmission, not only a square but also polygonal shapes, such as a triangle or hexagon, which can be easily fabricated may also be employed. In other words, any of these shapes is acceptable for the cross sectional shape of the damper thin shaft member 22, provided that it will engage in the shaft hole on the lever 30 side and enable torque transmission.

The shaft fixing member 31 projects out from a lever main body 32, so that the lever 30 is L-shaped. The lever 30 is typically connected to a driving member via a link structure or the like not pictured in the figures. As shown in FIG. 1C, this shaft fixing member 31 has a hollow cylindrical shape. An engaging hole 33 is formed at the center of shaft fixing member 31 into which the damper thin shaft member 22 is inserted, joining in a manner so as to enable torque transmission. The outer peripheral surface of shaft fixing member 31 is circular in cross section and is inserted into the shaft hole 14 of the wall member 11 in a manner so as to enable rotating. In other words, the engaging hole 33 in this embodiment has a square shape in cross section, equivalent to that of damper thin shaft member 22 so that the damper thin shaft member 22 can engage in the engaging hole without backlash. In addition, the circular cross sectional shape of the shaft fixing member 31 has the same diameter as the shaft hole 14, so that shaft fixing member 31 inserts into shaft hole 14 to enable smooth rotation without rattling.

The lever 30 is designed to connect to the damper thin shaft member 22 that has been inserted into the shaft hole 14 by pushing the lever 30 from the outside of wall member 11 in the shaft direction. As a result, this offers excellent operability, and enables the lever 30 to be fixed in place with surety.

Operation of a damper attaching structure of the above-described design will now be explained based on the damper attaching method (sequence).

Figure 2:
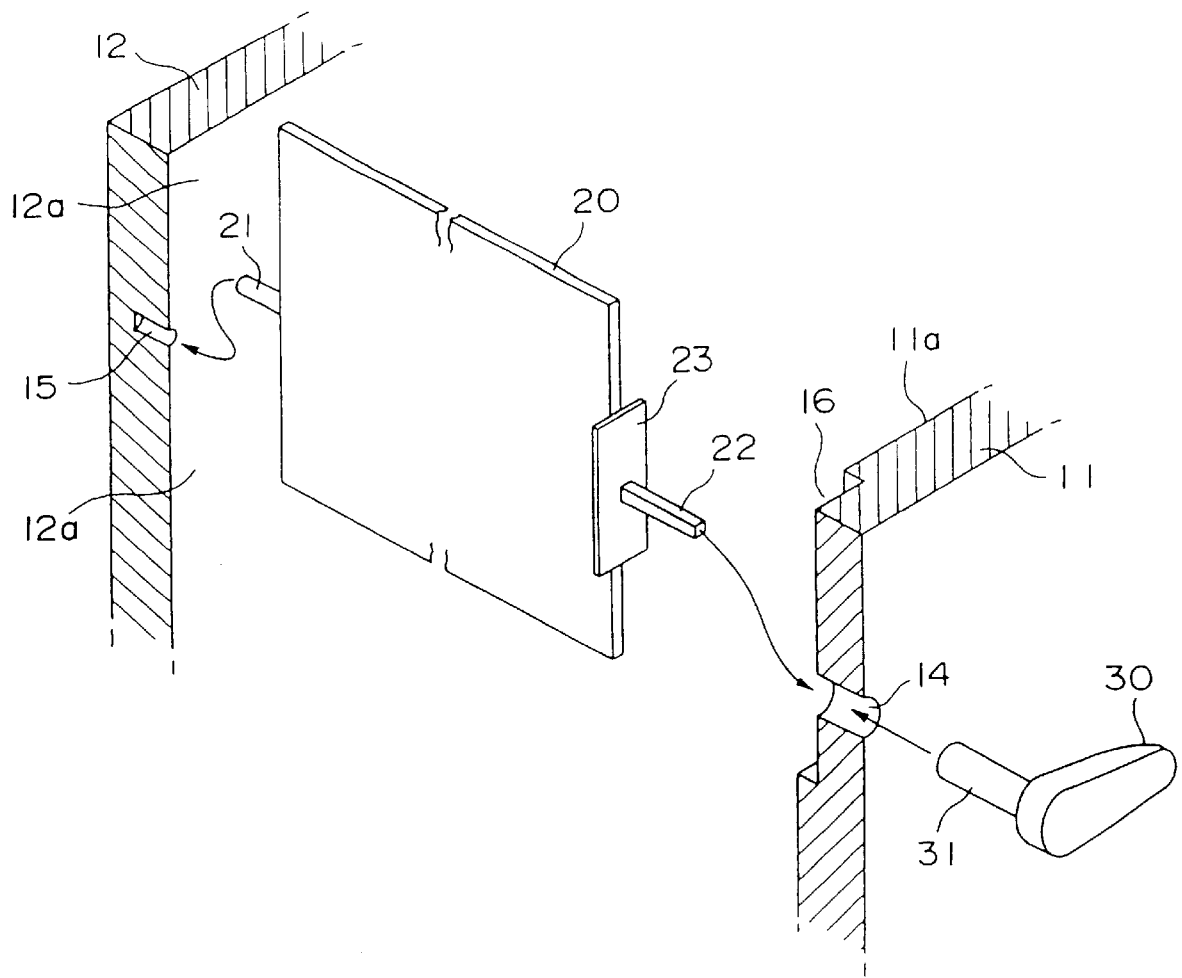
FIG. 2 is an exploded perspective view of FIG. 1.
Figure 3:
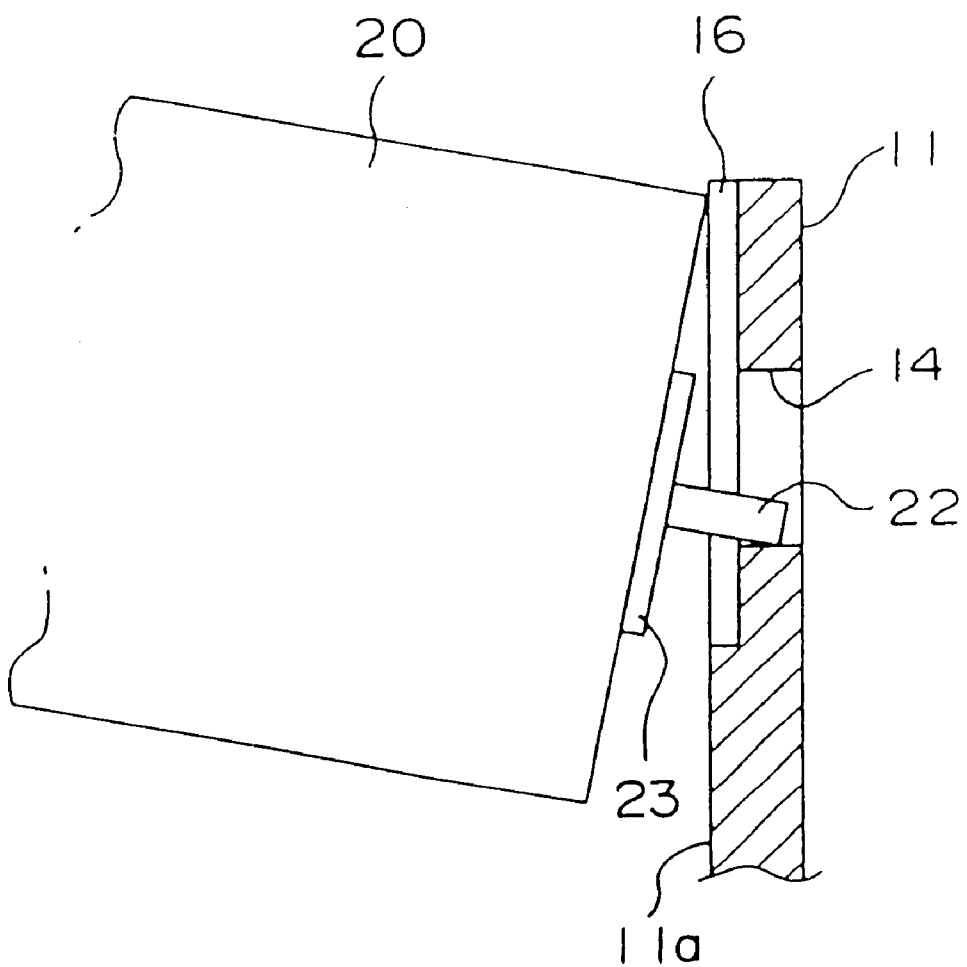
FIG. 3 is a view for explaining the damper attaching method according to the present invention, showing the principal part in the first step.

FIG. 2 shows the state prior to assembly of the damper 20. In the first step, the damper 20 is inclined toward the concave groove 16 which is formed to the inner surface 11a of wall member 11 and is continuous from casing opening 13. Namely, the end of damper thin shaft member 22 and positioning plate 23, which is provided to the base of damper thin shaft member 22, are inclined downward; introduced into concave groove 16 and lowered by sliding along the concave groove 16. As a result, the damper thin shaft member 22 is inserted into shaft hole 14 which opens in concave groove 16 (see FIG. 3).

The concave groove 16 functions as a recess for damper shaft member 21 and damper thin shaft member 22. The shaft hole 14 is larger in cross section than that of the damper thin shaft member 22, so that the inclined damper thin shaft member 22 is easy to insert. The presence of concave groove 16 is one reason why the damper thin shaft member 22 is readily insertable into the shaft hole 14.

The second step after the damper thin shaft member 22 is introduced into the shaft hole 14 is as follows. The positioning plate 23 is inserted into the concave groove 16, and the shaft member of damper 20 is no longer inclined but is made level. The positioning plate 23 is tightly contacted to the opposing surface on concave groove 16 by moving the damper 20 toward the wall member 11 side where the lever is attached.

Figure 4:
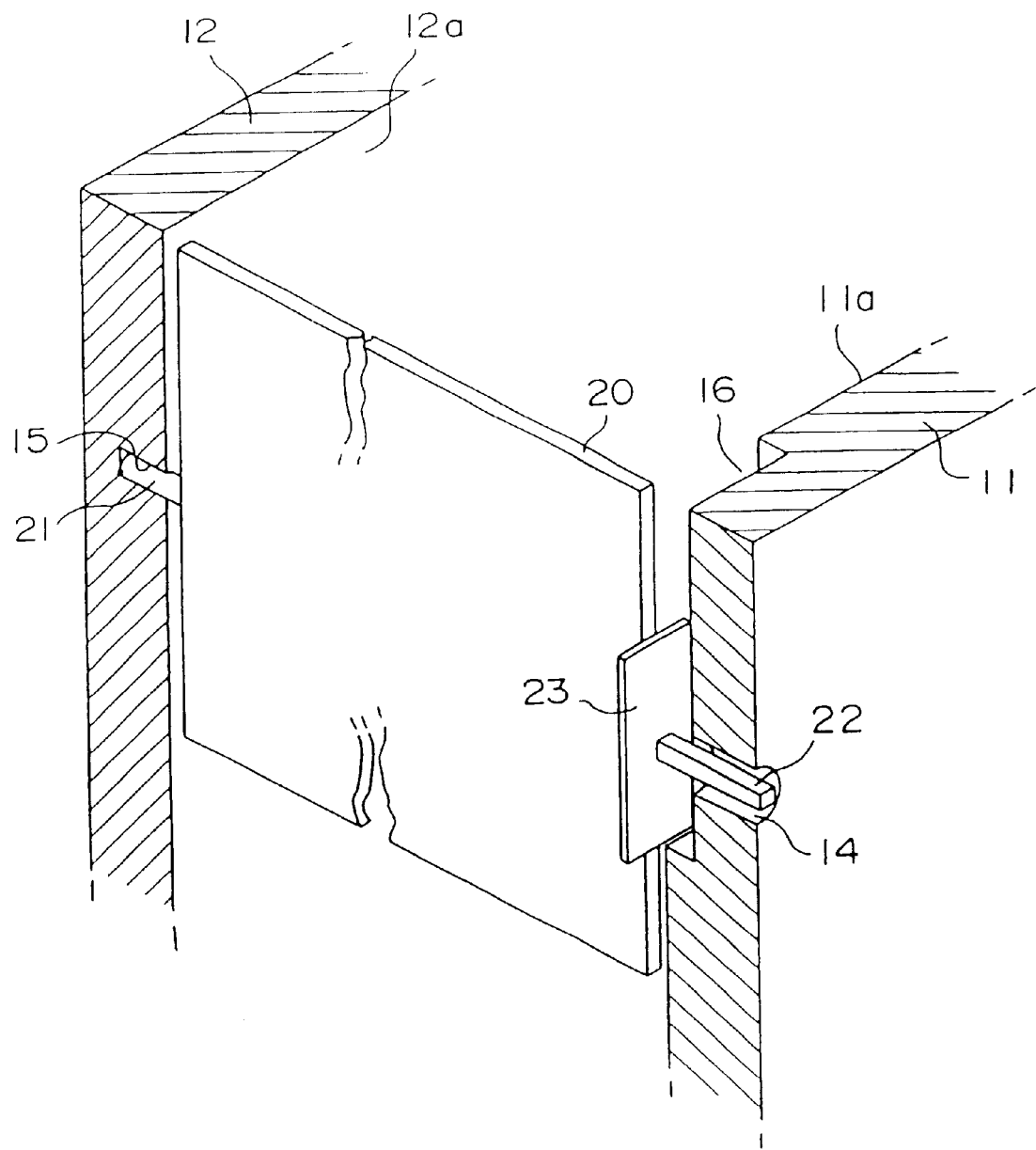
FIG. 4 is a view for explaining the damper attaching method according to the present invention, showing the state after completion of the second step.
Figure 5:
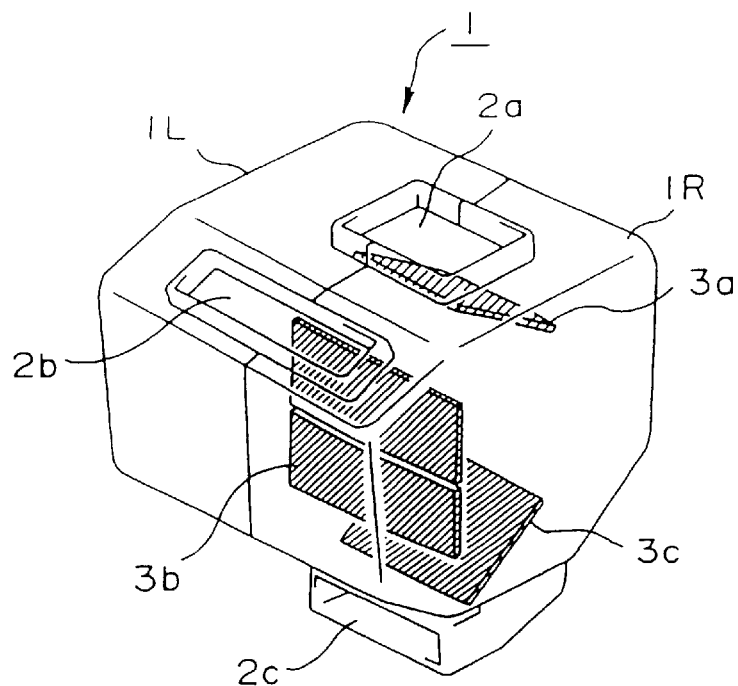
FIG. 5 is a perspective view showing the structure of an air conditioning unit provided as a conventional example.
Figure 6:
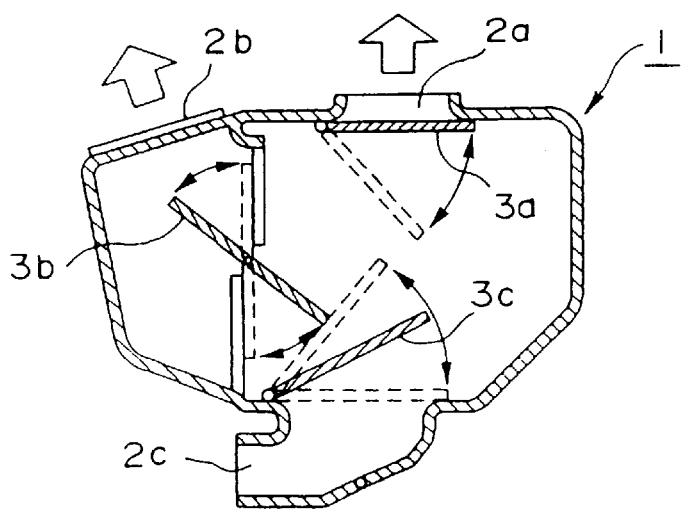
FIG. 6 is a vertical cross sectional view of FIG. 5.
Figure 7:
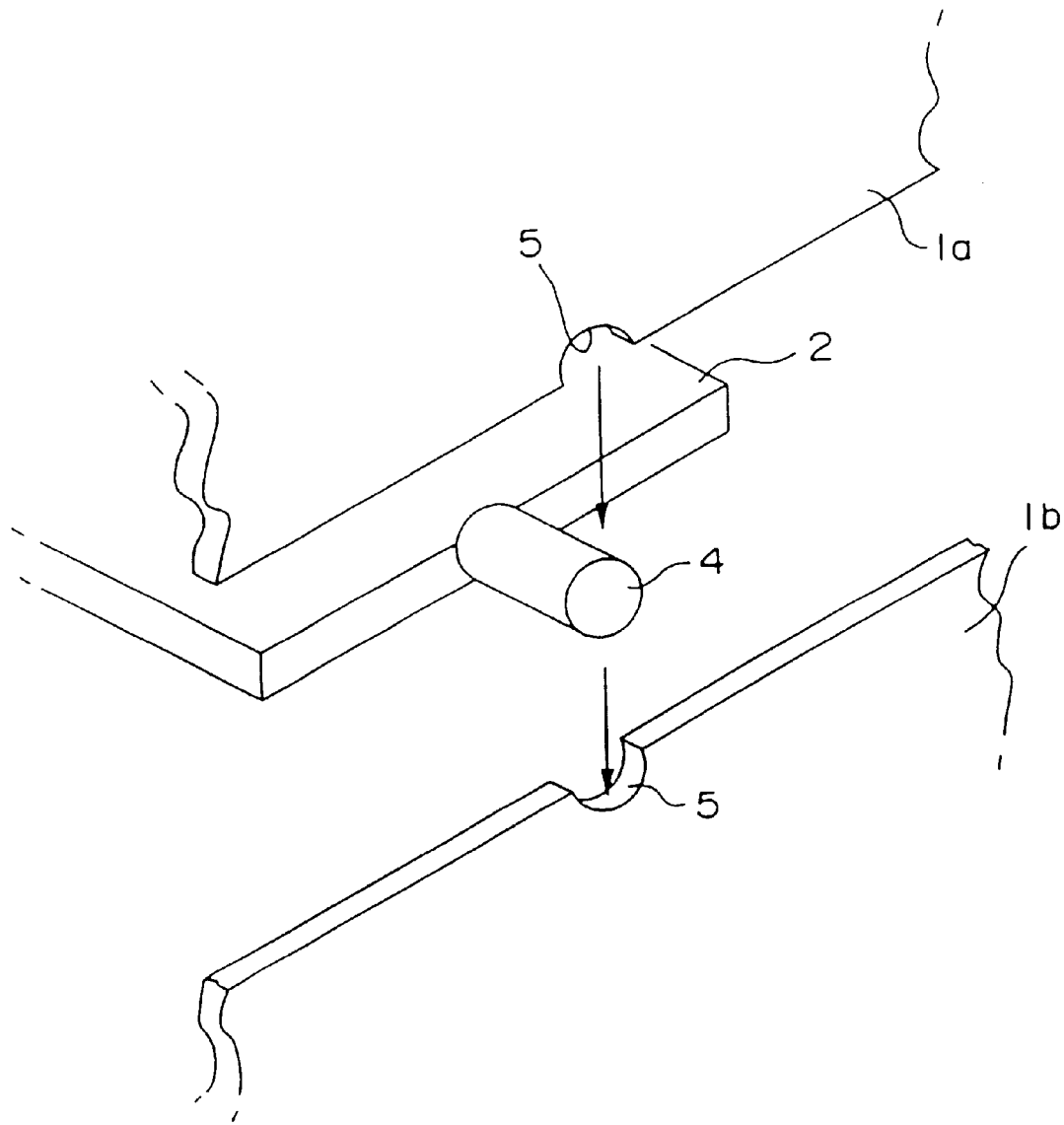
FIG. 7 is a principal portion exploded perspective view showing the assembly structure of a damper shaft employing a divided casing.
Figure 8:
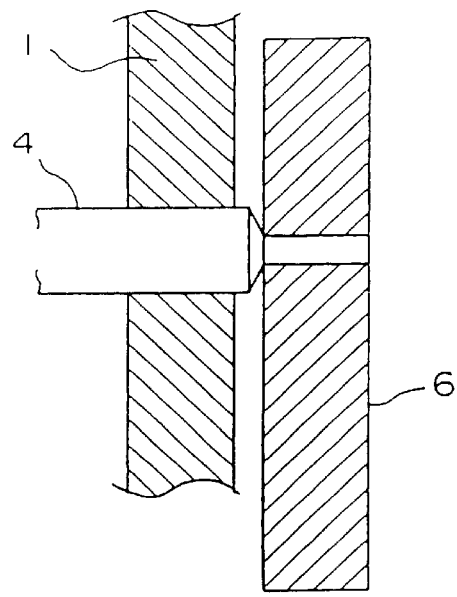
FIG. 8 is a cross sectional view showing a conventional example of the lever attaching structure for the rotational shaft.
Figure 9:
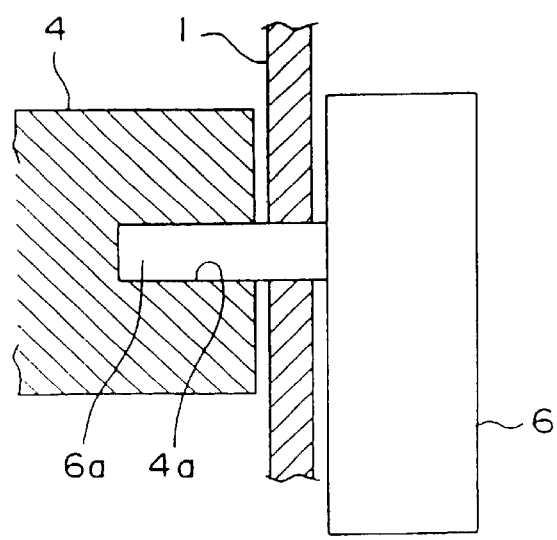
FIG. 9 is a cross sectional view showing another conventional example of the lever attaching structure for the rotational shaft.

The lengths of damper shaft member 21 and damper thin shaft member 22, and the depth of concave groove 16, are set so that the end surface of damper shaft member 21 can be introduced into the wall member 12 from its inner surface 12a. By horizontally moving the damper 20 toward the inner wall member 12, the damper shaft member 21, which is circular in cross section, can be inserted into the support hole 15, which has the same circular cross section and is provided in wall member 12. This arrangement is shown in FIG. 4. The damper thin shaft member 22 is loose within the shaft hole 14 which has a larger cross sectional shape than that of damper thin shaft member 22. In addition, a part of or the whole of the positioning plate 23 is within the concave groove 16 and extends in the center direction of the casing at this point in time. The damper 20 is in the attachment position in this state.

Next, in the third step with the positioning plate 23 being out from the concave groove 16, the damper 20 is rotated approximately 90° from the attachment position to the rotation position. In the embodiment shown in the figure, the damper 20 is moved 90° from the attachment position in which the damper is vertical (see FIG. 4), to the rotation position in which it the damper is horizontal as shown in FIG. 1A.

The damper 20 at the rotation position can oscillate employing the horizontal as the center of rotation. The length of positioning plate 23 is longer than the width W of concave groove 16 at this rotational center, so that positioning plate 23 intersects with the concave groove 16 (see FIG. 1B), and cannot be introduced into the concave groove 16. As a result, positioning plate 23 and the inner surface 11a of wall member 11 come into contact, so that positioning along the shaft direction of damper 20 occurs. Accordingly, if rectangular positioning plate 23 is not provided with a certain length dimension, then the limits within which the damper 20 can oscillate are reduced. Since the angle formed between the center line of positioning plate 23 and the center line along the longitudinal direction of concave groove 16 is set to be around 90°, it is possible to increase the limits within which damper 20 can oscillate.

Next, the shaft fixing member 31 which has the same circular shape as the circular shaft hole 14 is inserted, and the damper thin shaft member 22 which is square in cross section engages with the engaging hole 33 in the shaft fixing member 31, the engaging hole 33 having the same cross sectional shape as the damper thin shaft member 22. The damper thin shaft member 22 and the lever 30 are connected in a manner that enables torque transmission, so that the damper shaft member 21 and the shaft fixing member 31 can be smoothly rotated employing the support hole 15 and the shaft hole 14 as their respective bearings.

The operation required to attach the lever 30 can also be performed prior to moving the damper 20 to the rotation position. Namely, in this case, the damper 20 may be moved to the rotation position after attachment of the lever 30.

As described above, the damper attaching structure and the damper attaching method of the present invention enable the damper 20 which is longer than the wall members 11 and 12 to be assembled inside the casing by inserting through the opening 13. As a result, it is not absolutely necessary to separate the casing at the attachment position for the damper 20. Further, when attaching a plurality of dampers 20, it may be the case that the directions for inserting and attaching the dampers are not the same. However, even in this type of situation, the present invention enables the dampers to be assembled without considering dividing the casing.

Provided there is an opening, such as a casing connection opening or a suitably shaped outlet port, the present invention can be easily executed by employing these openings effectively.

Furthermore, in the preceding embodiments, the length of positioning plate 23 is disposed so as to be level with the damper 20. However, this may be suitably altered after taking into consideration the position of opening 13 and the oscillation limits for damper 20. Namely, the length of positioning plate 23 may be set so that the angle between the long side of positioning plate 23 and damper 20 is 90° or 60°, for example.

Industrial Applicability

The damper attaching structure and damper attaching method the present invention provide the following effects.

(1) Because an opening in the casing or the like can be employed to assemble the shaft member of the damper, the casing does not need to be divided. Thus, there is an improvement in the degree of design freedom permitted.

(2) There is greater freedom with respect to placement of the damper, since it can be attached to a position where damper assembly could not be located in the conventional design and method.

(3) There is a great improvement in the operability of the assembly operation for the shaft fixing member in the lever which fixes the damper thin shaft member in a manner so as to enable torque transmission. Thus, it is possible to prevent damage to the casing or the like due to improper assembly.

What is claimed is:

1. A damper attaching structure in which both ends of a damper which is disposed between opposing wall members of a casing are supported by the wall members in a manner so as to enable free rotation wherein the rotation operation of the damper is performed via a lever attached by a damper shaft member on the outside of the wall member; the damper attaching structure comprising:

a concave groove formed in the inner surface of the wall member and continuous with a casing opening;

a positioning member provided at the base of the damper shaft member on a damper side thereof;

a shaft hole opening at the concave groove, which is larger in cross section than the cross section of the damper shaft;

a shaft fixing member provided on the lever and rotatably inserted into the shaft hole; and an engaging hole into which the damper shaft member is inserted and which engages the damper shaft member to enable torque transmission;

wherein the concave groove is larger in shape than the positioning member, the positioning member is inserted into the concave groove at the attachment position of the damper, and the positioning member adjusts the position of the damper along the shaft direction by intersection with the concave groove at the rotation position of the damper.

2. A damper attaching structure according to claim 1, wherein the angle formed between the positioning member and a center line in the longitudinal direction of the concave groove at a position of the rotational center when the damper is operating is set to approximately 90°.

3. A damper attaching structure according to claim 1, wherein the positioning member and the concave groove are of the same shape and have an aspect ratio such that the positioning member is insertable into the concave groove.

4. A damper attaching structure according to claim 1, wherein the damper shaft and the engaging hole have the same polygonal shape in cross section.

5. A damper attaching structure according to claim 4, wherein the lever is joined to the damper shaft which has been inserted into the shaft hole by pushing the lever in the direction of the shaft from the outside of the wall member.

6. A damper attaching method, wherein both ends of a damper which is disposed between opposing wall members of a casing are supported by the wall members in a manner so as to enable free rotation and the rotation operation of the damper is performed via a lever attached by a damper shaft member on the outside of the wall member; which comprises:

inclining the end of the damper shaft member and a positioning member, which is provided at the base of the damper shaft member on the damper side thereof, downward; inserting the end of said damper shaft member and said positioning member into a concave groove that is formed in the inner surface of the wall member and is continuous with a casing opening, and inserting the damper shaft member into a shaft hole which opens at the concave groove and which is larger in cross section than the cross section of the damper shaft member;

inserting, after the positioning member has been inserted into the concave groove and the damper has been moved to the lever attachment side, the damper shaft member, which is circular in cross section, into the shaft hole which is circular in cross section that is provided in the wall member opposite the wall member on the lever attachment side; and rotating, with the positioning member projecting out from the concave groove, the damper from an attachment position to a rotation position, while at the same time inserting a shaft fixing member on the lever into the shaft hole in a manner so as to enable rotation joining an engaging hole, provided in the shaft fixing member, to the damper shaft so as to enable torque transmission.

7. A damper attaching method according to claim 6, wherein the rotating of the damper from the attachment position to the rotation position comprises rotating the damper approximately 90°.

* * * * *